US011835286B2

(12) United States Patent
Takayanagi et al.

(10) Patent No.: US 11,835,286 B2
(45) Date of Patent: Dec. 5, 2023

(54) TANK COOLING APPARATUS

(71) Applicant: Yachiyo Industry Co., Ltd., Sayama (JP)

(72) Inventors: Masateru Takayanagi, Saitama (JP); Ryotaro Toyofuku, Saitama (JP); Fumihiro Tokumitsu, Saitama (JP); Takuya Masada, Saitama (JP); Tetsuya Nagashita, Saitama (JP); Yuichi Kato, Saitama (JP)

(73) Assignee: Yachiyo Industry Co., Ltd., Sayama (JP)

( * ) Notice: Subject to any disclaimer, the term of this patent is extended or adjusted under 35 U.S.C. 154(b) by 0 days.

(21) Appl. No.: 18/031,779

(22) PCT Filed: Aug. 17, 2021

(86) PCT No.: PCT/JP2021/029996
§ 371 (c)(1),
(2) Date: Apr. 13, 2023

(87) PCT Pub. No.: WO2022/079996
PCT Pub. Date: Apr. 21, 2022

(65) Prior Publication Data
US 2023/0272960 A1 Aug. 31, 2023

(30) Foreign Application Priority Data
Oct. 13, 2020 (JP) .................................. 2020-172326

(51) Int. Cl.
*F25D 17/02* (2006.01)
*B60K 15/03* (2006.01)
(Continued)

(52) U.S. Cl.
CPC .............. *F25D 17/02* (2013.01); *B29C 49/66* (2013.01); *B60K 15/03* (2013.01);
(Continued)

(58) Field of Classification Search
CPC .............. F25D 17/02; F25D 2331/802; F25D 2331/803; F25D 17/00; F25D 31/006;
(Continued)

(56) References Cited

U.S. PATENT DOCUMENTS 5,190,715 A * 3/1993 Yamada .............. B29C 49/4823
264/528

FOREIGN PATENT DOCUMENTS

| JP | 2003145576 | 5/2003 |
|----|------------|--------|
| JP | 2004202728 | 7/2004 |

(Continued)

OTHER PUBLICATIONS

PCT International Search Report (w/ English translation) and Written Opinion for corresponding PCT Application No. PCT/JP2021/029996, dated Nov. 2, 2021, 8 pages.

*Primary Examiner* — Jerry-Daryl Fletcher
*Assistant Examiner* — Daniel C Comings
(74) *Attorney, Agent, or Firm* — Dority & Manning, PA

(57) ABSTRACT

A cooling apparatus includes: a pair of movable frames provided to be movable relative to each other so as to clamp a tank; multiple contact members provided on each of the pair of movable frames and each having a contact surface configured to contact an outer surface of the tank; a cooling liquid supply passage provided with multiple cooling liquid supply ports that respectively open in the contact surfaces of the contact members to supply a cooling liquid toward the outer surface of the tank; and a cooling liquid supply device that supplies the cooling liquid to the cooling liquid supply passage. Each of the contact surfaces is provided with grooves extending from a corresponding one of the cooling liquid supply ports to an outer edge of the contact surface.

9 Claims, 6 Drawing Sheets

(51) Int. Cl.
*B29C 49/66* (2006.01)
*B29C 49/64* (2006.01)

(52) U.S. Cl.
CPC ............... *B29C 2049/6606* (2022.05); *B29C 2049/6661* (2013.01); *B60K 2015/03493* (2013.01)

(58) Field of Classification Search
CPC ... F25D 31/007; B29C 35/00; B29C 49/6427; B29C 49/66; B29C 2049/6606; B29C 2049/6661
See application file for complete search history.

(56) References Cited

FOREIGN PATENT DOCUMENTS

| | | | | |
|---|---|---|---|---|
| JP | 2007261164 | 10/2007 | | |
| JP | 2017065031 | 4/2017 | | |
| JP | 2017065031 A | * 4/2017 | ............. | B29C 49/42 |
| JP | 2018192629 | 12/2018 | | |
| WO | WO-2010012958 A2 | * 2/2010 | ......... | B29C 44/5654 |

* cited by examiner

TANK COOLING APPARATUS

CROSS REFERENCE TO RELATED APPLICATIONS

This application is the U.S. National Stage entry of International Application No. PCT/JP2021/029996, filed on Aug. 17, 2021, which, in turn, claims priority to Japanese Patent Application No. 2020-172326, filed on Oct. 13, 2020, both of which are hereby incorporated herein by reference in their entireties for all purposes.

TECHNICAL FIELD

The present disclosure relates to a cooling apparatus for cooling a hollow tank formed of a thermoplastic synthetic resin.

BACKGROUND ART

A tank formed to be hollow by blow molding a thermoplastic synthetic resin material is sometimes used as a fuel tank for an automobile or a watercraft. There is known a cooling apparatus for cooling the molded synthetic resin tank to improve the turnover rate of the mold for blow molding (Patent Document 1). This cooling apparatus includes a jig provided with shape holding members configured to externally contact the tank taken out from the mold, a shower nozzle for spraying a cooling liquid onto the outer surface of the tank set in the jig, and means for conducting cooling air to the inside of the tank. This cooling apparatus liquid-cools the outer side of the tank with the cooling liquid and air-cools the inner side of the tank with the cooling air.

In the aforementioned cooling apparatus, there is a possibility that a part of the tank not held by the shape holding members may deform due to heat shrink, and a cooling apparatus for solving this problem has been proposed (Patent Document 2). This cooling apparatus is configured to be capable of closing the mold and is provided with a mold which, in the mold closed state, can accommodate the tank in the cavity in a close contact state, wherein the cooling apparatus cools the tank by feeding the cooling liquid to between the outer surface of the tank and the mold surface defining the cavity, and applies an internal pressure to the tank by feeding the cooling air to the inside of the tank.

PRIOR ART DOCUMENT(S)

Patent Document(s)

Patent Document 1: JP2004-202728A
Patent Document 2: JP2017-065031A

SUMMARY OF THE INVENTION

Task to be Accomplished by the Invention

However, in the cooling apparatus described in Patent Document 2, the tank is accommodated in the cavity in the mold closed state, and therefore, though the tank can be generally cooled, a part of the tank cannot be reliably cooled. Also, since, in the mold closed state, the tank is accommodated in the cavity and the cooling liquid flows between the outer surface of the tank and the mold surface, there is a risk that the close contact between the tank and the mold may not be maintained. In other words, there is a risk that the tank may deform so that the dimension of a predetermined part of the tank may not be maintained at a desired value.

In the cooling apparatus described in Patent Document 1, by bringing the shape holding members into contact with parts of the outer surface of the tank, it is possible to maintain the shape of these contact parts in the desired dimensions. On the other hand, the contact parts contacted by the shape holding members cannot be cooled.

In view of such background, an object of the present invention is to provide a tank cooling apparatus capable of cooling desired parts reliably while reducing dimensional errors of these parts.

Means to Accomplish the Task

To achieve such an object, one embodiment of the present invention is a cooling apparatus (10) for cooling a hollow tank (1) made of a thermoplastic synthetic resin, the cooling apparatus comprising: a pair of movable frames (14, 15) provided to be movable relative to each other so as to clamp the tank; multiple contact members (30) provided on each of the pair of movable frames and each having a contact surface (30a) configured to contact an outer surface of the tank; a cooling liquid supply passage (26) provided with multiple cooling liquid supply ports (26a) that respectively open in the contact surfaces of the contact members to supply a cooling liquid toward the outer surface of the tank; and a cooling liquid supply device (27) that supplies the cooling liquid to the cooling liquid supply passage, wherein each of the contact surfaces is provided with grooves (50) extending from a corresponding one of the cooling liquid supply ports to an outer edge of the contact surface.

According to this configuration, since the multiple cooling liquid supply ports of the cooling liquid supply passage open in the contact surfaces of the multiple contact members, desired parts of the tank can be reliably cooled by providing the contact members at the parts to be cooled. Also, since the contact surface of each contact member is provided with grooves extending from the cooling liquid supply port to the outer edge of the contact surface, the tank can be cooled in a state in which contact between the tank and each contact member is maintained. Thus, deformation of the contact parts of the tank is suppressed and dimensional errors of the contact parts are reduced.

Preferably, the grooves (50) are provided on the contact surface (30a) in a grid pattern.

According to this configuration, the part of the tank contacted by each contact member can be cooled evenly. Also, compared to a case where the grooves are formed to extend radially from the cooling liquid supply port, the cooling liquid is more likely to create a turbulence, whereby the cooling efficiency is high. In addition, machining of the grooves on the contact member is easy.

Preferably, the cooling apparatus further comprises a receiving member (20) including a pair of receptacle halves (20L, 20U) for receiving a part of the tank, wherein the pair of receptacle halves are supported by the pair of movable frames (14, 15) and have respective concave surfaces (23L, 23U) that oppose the outer surface of the tank (1) via a predetermined gap, and the contact members (30) are disposed to protrude from the concave surfaces of the receiving member, and a cooling liquid discharge outlet (28) is provided in the receiving member.

The cooling liquid supplied from the cooling liquid supply port opening in the contact surface of each contact member toward the outer surface of the tank passes through the grooves to flow through the gap between each of the concave surfaces of the receiving member and the outer surface of the tank, and is discharged to the outside from the cooling liquid discharge outlet provided in the receiving member. Since the tank is received by the two receptacle halves of the receiving member, the tank is cooled as a whole by the cooling liquid flowing through the gap between the tank and the receiving member. Therefore, it is possible to cool the whole tank in a short time while suppressing the deformation and dimensional errors.

Preferably, the concave surfaces of the receiving member (20) are provided with multiple recesses (29), and the contact members (30) are supported by the receiving member in a state partially received in the recesses.

According to this configuration, in order to arrange the contact members, it is unnecessary to provide the receiving member with through holes larger than the contact members. Therefore, the cooling liquid does not leak through the through holes in large amounts, and the whole tank can be cooled efficiently.

Preferably, the contact members (30) are supported by the receiving member (20) to be position-adjustable in an advancing and retreating direction.

According to this configuration, even when there is a manufacturing error in the receiving member, each contact member can be arranged in the desired position. Thereby, the tank after the cooling can be made to the desired dimensions.

Preferably, the contact members (30) are supported by the receiving member to be also angle-adjustable.

According to this configuration, even when there is a manufacturing error in the receiving member, each contact member can be arranged in the desired direction. Thereby, the tank after the cooling can be made to the desired shape.

Preferably, the pair of receptacle halves (20L, 20U) is provided with clamping parts (31) for clamping a tank mounting piece (2) which is protrudingly formed on the outer surface of the tank (1).

According to this configuration, the relative position of the part of the tank contacted by each contact member and the tank mounting piece clamped by the clamping parts can be set to the desired relationship. Thereby, the tank can be cooled in a state in which the desired shape with respect to the tank mounting piece is maintained.

Preferably, the cooling apparatus further comprising a pressure applying device (37) for applying an internal pressure to the tank, wherein the pressure applying device includes a gas supply pipe (33) which is provided in the receiving member (20) and protrudes into an inside of the tank (1) to supply gas to the inside of the tank.

According to this configuration, since the gas supplied from the gas supply pipe to the inside of the tank applies an internal pressure to the tank, the contact between the tank and each contact member can be maintained reliably.

Preferably, the cooling apparatus further comprising a lock device (40) that fixes the pair of movable frames (14, 15) to prevent the pair of receptacle halves (20L, 20U) from being separated from each other due to application of the internal pressure by the pressure applying device (37) and supply of the cooling liquid by the cooling liquid supply device (27) in a state in which the receiving member (20) receives the tank (1).

According to this configuration, the positions of the multiple contact members provided on the movable frame are fixed, and therefore, change of the shape and dimension of the tank due to cooling can be prevented.

Effect of the Invention

Thus, according to the present invention, a tank cooling apparatus capable of cooling desired parts reliably while reducing dimensional errors of these parts can be provided.

MODE(S) FOR CARRYING OUT THE INVENTION

In the following, an embodiment of the present invention will be described in detail with reference to the drawings. In the present embodiment, the present invention is applied to a cooling apparatus 10 for a fuel tank 1.

Figure 1:
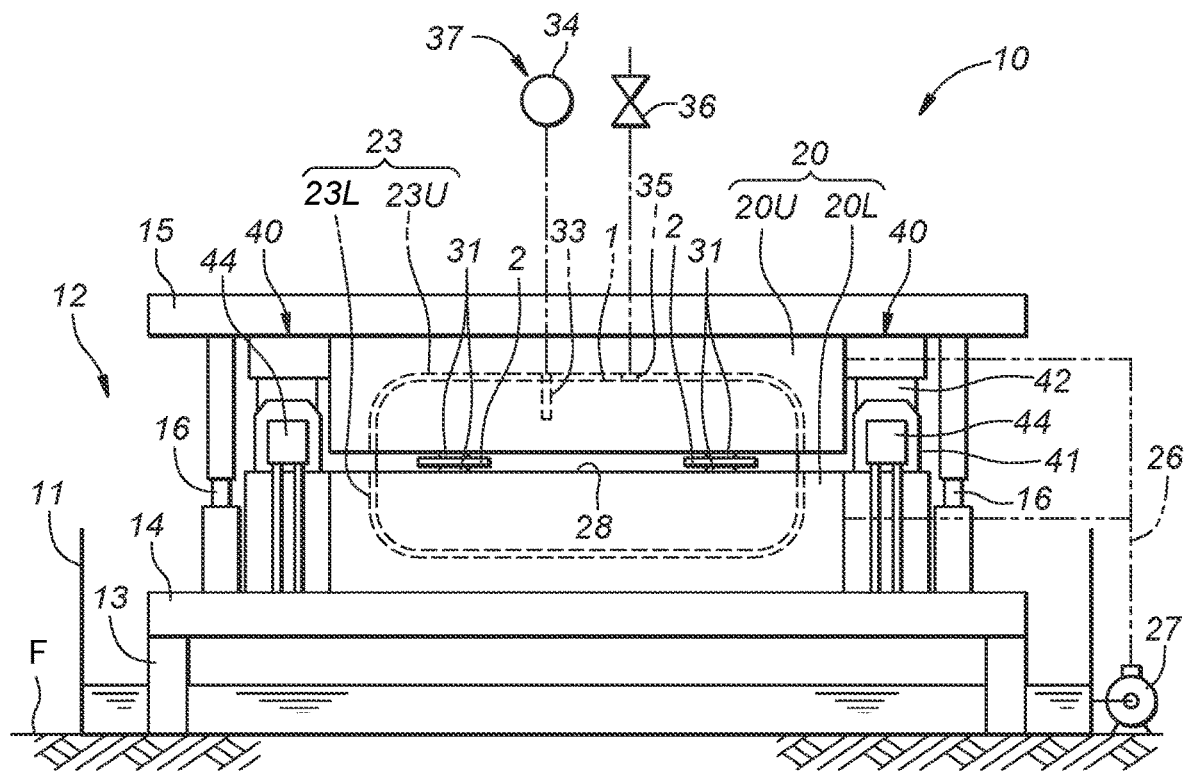
FIG. 1 is a side view of a cooling apparatus according to an embodiment.

FIG. 1 is a side view of a cooling apparatus 10 according to the embodiment. The cooling apparatus 10 is used to cool a fuel tank 1 taken out from a mold for blow molding not shown in the drawings, where the fuel tank 1 is a hollow resin molded product made of a thermoplastic synthetic resin. The cooling apparatus 10 includes a cooling liquid tank 11 provided on a floor surface F and a cooling stage 12 provided in the cooling liquid tank 11. The cooling liquid tank 11 stores a cooling liquid (for example, water) for cooling the fuel tank 1.

The cooling stage 12 includes support legs 13, a lower frame 14 supported above the cooling liquid by the support legs 13, and an upper frame 15 disposed above the lower frame 14. The lower frame 14 is fixed to the cooling liquid tank 11, and the upper frame 15 is coupled to the lower frame 14 via lift devices 16. The upper frame 15 moves up and down to clamp the fuel tank 1 according to the lifting and lowering operation of the lift devices 16. The lower frame 14 and the upper frame 15 constitute a pair of movable frames. For example, the lift devices 16 are each constituted of an air cylinder which performs expansion and contraction operation, and are disposed at four corners of the cooling stage 12 which is rectangular in shape in plan view.

A receiving member 20 for receiving the fuel tank 1 is supported by the lower frame 14 and the upper frame 15. The receiving member 20 includes a lower receptacle half 20L supported by the lower frame 14 and an upper receptacle half 20U supported by the upper frame 15. The lower frame 14 and the lower receptacle half 20L constitute a lower half of the cooling stage 12, and the upper frame 15 and the upper receptacle half 20U constitute an upper half of the cooling stage 12.

An upper surface of the lower receptacle half 20L is formed with a lower concave surface 23L to receive a lower portion of the fuel tank 1. A lower surface of the upper receptacle half 20U is formed with an upper concave surface 23U to receive an upper portion of the fuel tank 1. In the following, the lower concave surface 23L and the upper concave surface 23U together may be referred to as concave surfaces 23. In the state shown in FIG. 1 in which the lift devices 16 are contracted and the cooling stage 12 clamps the fuel tank 1, the upper receptacle half 20U defines a gap between itself and the lower receptacle half 20L and cooperates with the lower receptacle half 20L to surround the fuel tank 1.

The cooling apparatus 10 further includes a cooling liquid supply passage 26 extending to an inside of the receiving member 20 (within the concave surfaces 23) to supply the cooling liquid toward the outer surface of the fuel tank 1, and a cooling liquid pump 27 serving as a cooling liquid supply device that supplies the cooling liquid to the cooling liquid supply passage 26. The cooling liquid supply passage 26 is constituted of a part defined by a cooling liquid piping which connects the cooling liquid pump 27 to the receiving member 20 and consists of a hose, for example, and a part consisting of through holes formed in the receiving member 20. In FIG. 1, the cooling liquid supply passage 26 is shown to branch into two passes extending to the lower half and the upper half of the cooling stage 12, but as will be described later, it actually branches into more number of passages. The gap between the upper receptacle half 20U and the lower receptacle half 20L functions as a cooling liquid discharge outlet 28. The cooling liquid discharged from the cooling liquid discharge outlet 28 accumulates in the cooling liquid tank 11. When cooling the fuel tank 1, the cooling liquid absorbs heat from the fuel tank 1 and the temperature thereof rises, and therefore, it is preferred to provide a heat exchanger in an appropriate position of the cooling liquid supply passage 26.

Figure 2:
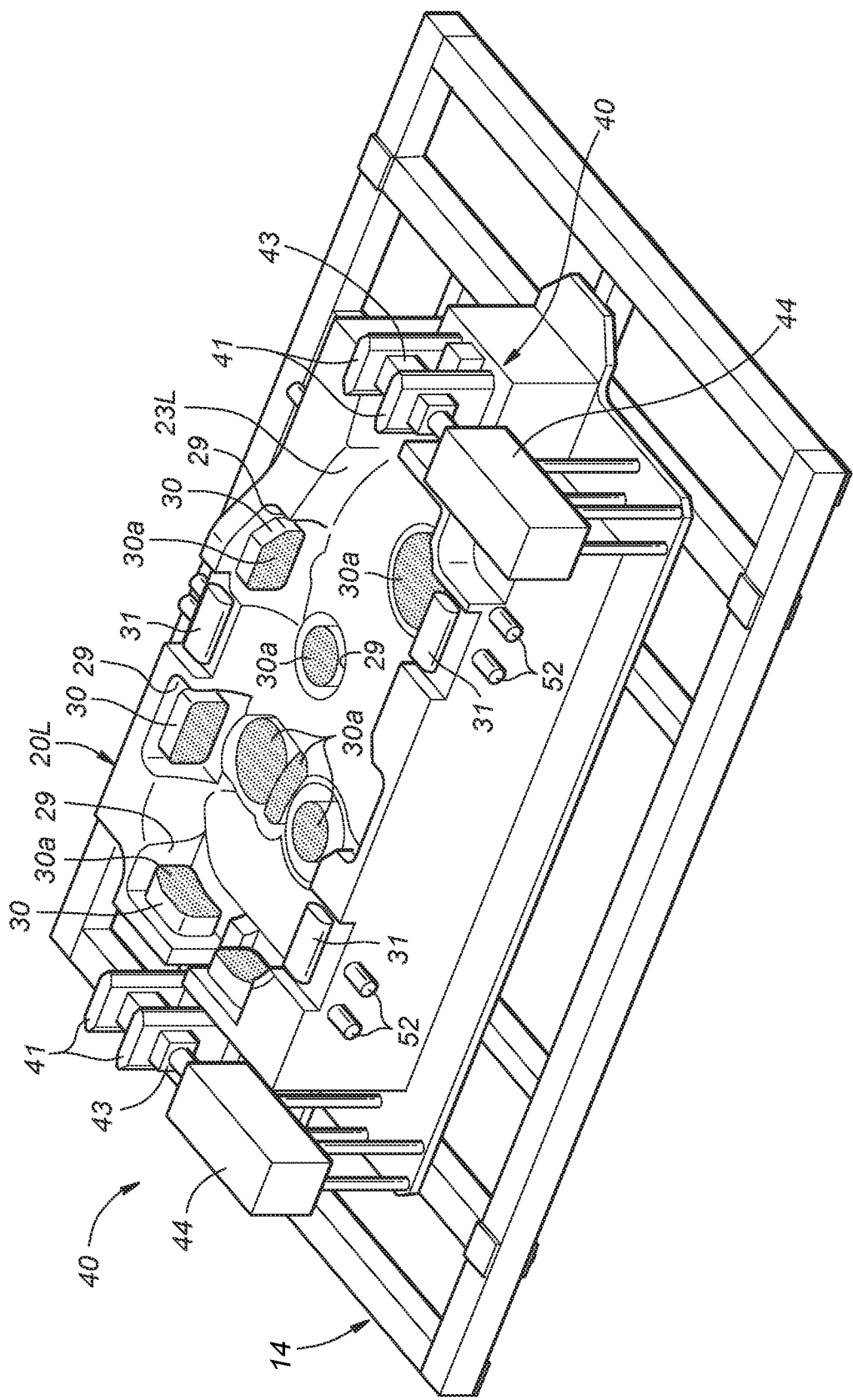
FIG. 2 is a perspective view of a lower half of a cooling stage shown in FIG. 1.
Figure 3:
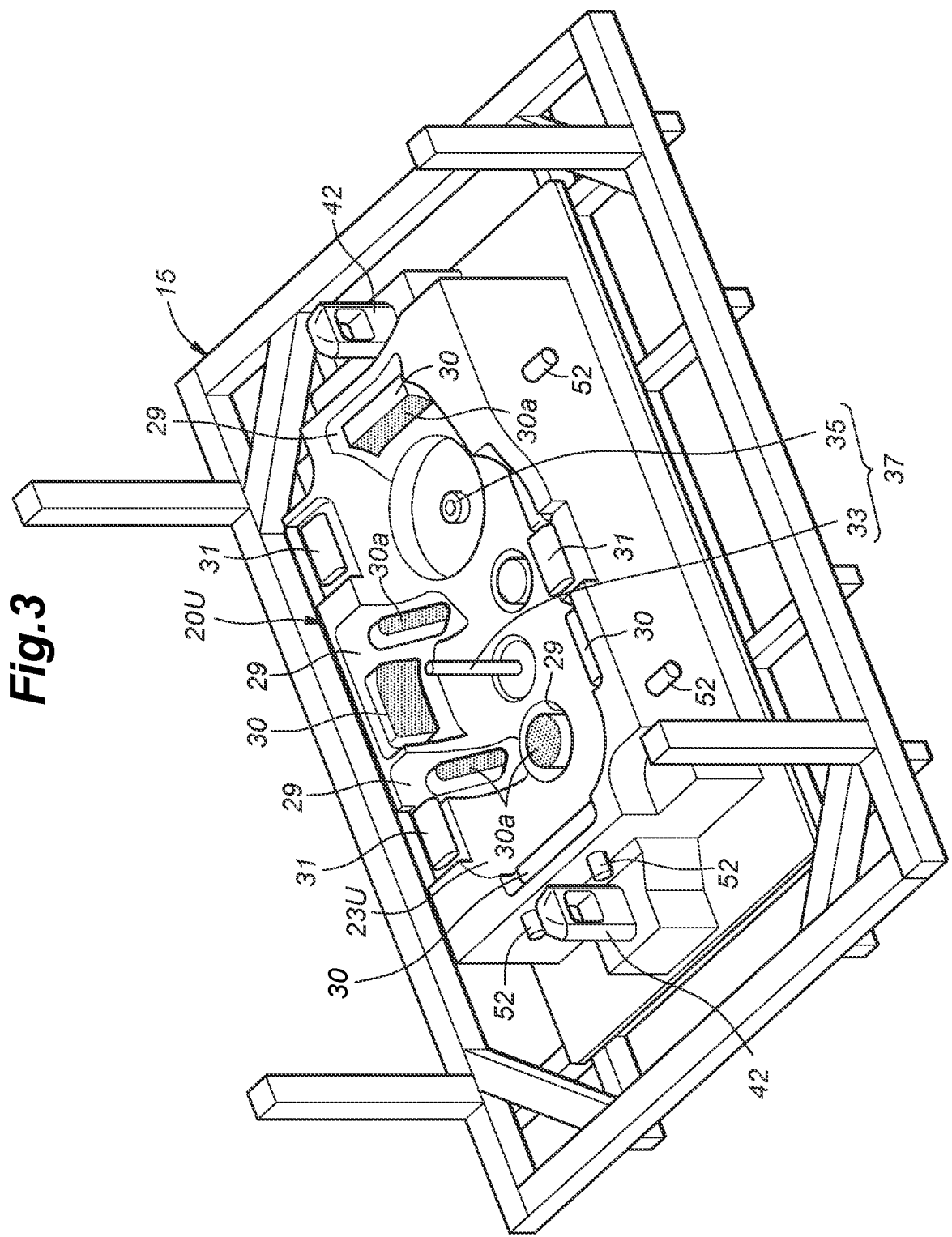
FIG. 3 is a perspective view of an upper half of the cooling stage shown in FIG. 1.

FIG. 2 is a perspective view of the lower half of the cooling stage 12 shown in FIG. 1, and FIG. 3 is a perspective view of the upper half of the cooling stage 12 shown in FIG. 1. As shown in FIG. 2, the lower frame 14 is configured by multiple square steel pipes arranged in a grid pattern and has a rectangular shape. The lower receptacle half 20L is smaller than the lower frame 14 and is supported at approximately the center of the lower frame 14. The lower concave surface 23L defined on the upper surface of the lower receptacle half 20L is formed to be larger than the lower portion of the fuel tank 1. As shown in FIG. 3, the upper frame 15 is configured by multiple square steel pipes arranged in a grid pattern and has a rectangular shape. The upper receptacle half 20U is smaller than the upper frame 15 and is supported at approximately the center of the upper frame 15. The upper concave surface 23U defined on the lower surface of the upper receptacle half 20U is formed to be larger than the upper portion of the fuel tank 1.

As shown in FIGS. 2 and 3, the lower concave surface 23L and the upper concave surface 23U are formed with multiple smaller recesses 29. In each of the recesses 29, a contact member 30 having a contact surface 30a for contacting the outer surface of the fuel tank 1 to hold the fuel tank 1 is provided such that a part of the side of the contact member 30 opposite from the contact surface 30a is received in the recess 29. Each contact member 30 is disposed to protrude from the lower concave surface 23L of the upper concave surface 23U corresponding thereto, and the contact surface 30a is provided on this protruding part of the contact member 30.

In the outer peripheral portions of the mutually opposing surfaces of the lower receptacle half 20L and the upper receptacle half 20U, clamping parts 31 for clamping tank mounting pieces 2 (see FIG. 1) which are protrudingly formed on the outer surface of the fuel tank 1 are provided. In the present embodiment, three tank mounting pieces 2 are formed on the outer peripheral portion of the fuel tank 1, and each of the lower receptacle half 20L and the upper receptacle half 20U is provided with three clamping parts 31. The parts of the lower receptacle half 20L and the upper receptacle half 20U where the clamping parts 31 are provided are notched so that portions of the clamping parts 31 are received therein. Thereby, in the state in which the lower receptacle half 20L and the upper receptacle half 20U surround the fuel tank 1 with their clamping parts 31 clamping the tank mounting pieces 2, the cooling liquid discharge outlet 28 formed between the upper receptacle half 20U and the lower receptacle half 20L is prevented from becoming too large.

Figure 4:
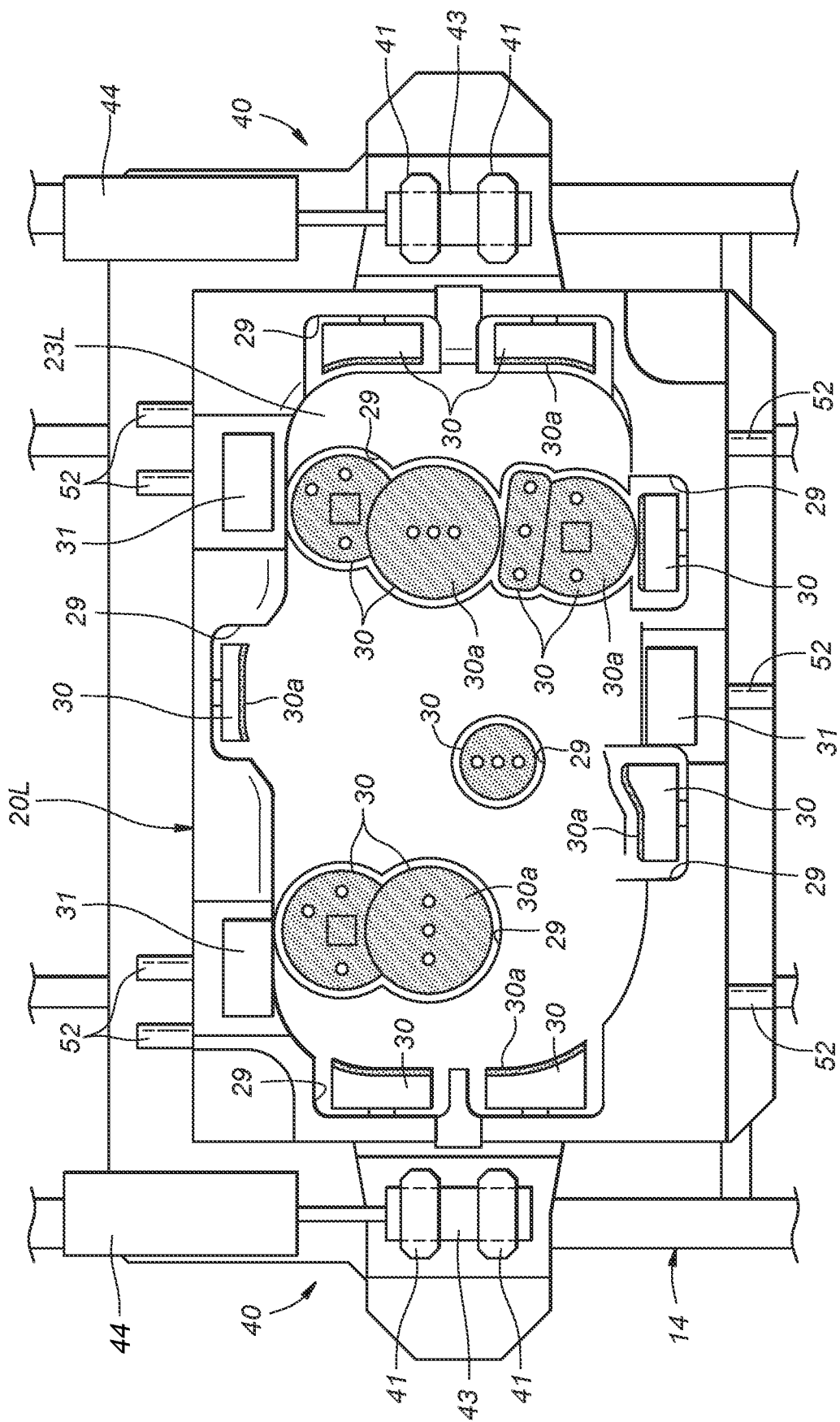
FIG. 4 is a plan view of the lower receptacle half shown in FIG. 2.

FIG. 4 is a plan view of the lower receptacle half 20L shown in FIG. 2. As shown in FIGS. 2 and 4, the lower concave surface 23L of the lower receptacle half 20L is provided with multiple (seven in the illustrated example) contact members 30 on a bottom portion thereof and multiple (seven in the illustrated example) contact members 30 on a side peripheral portion thereof. The contact members 30 have various shapes such as circular, part-circular, substantially rectangular, etc.

Figure 5:
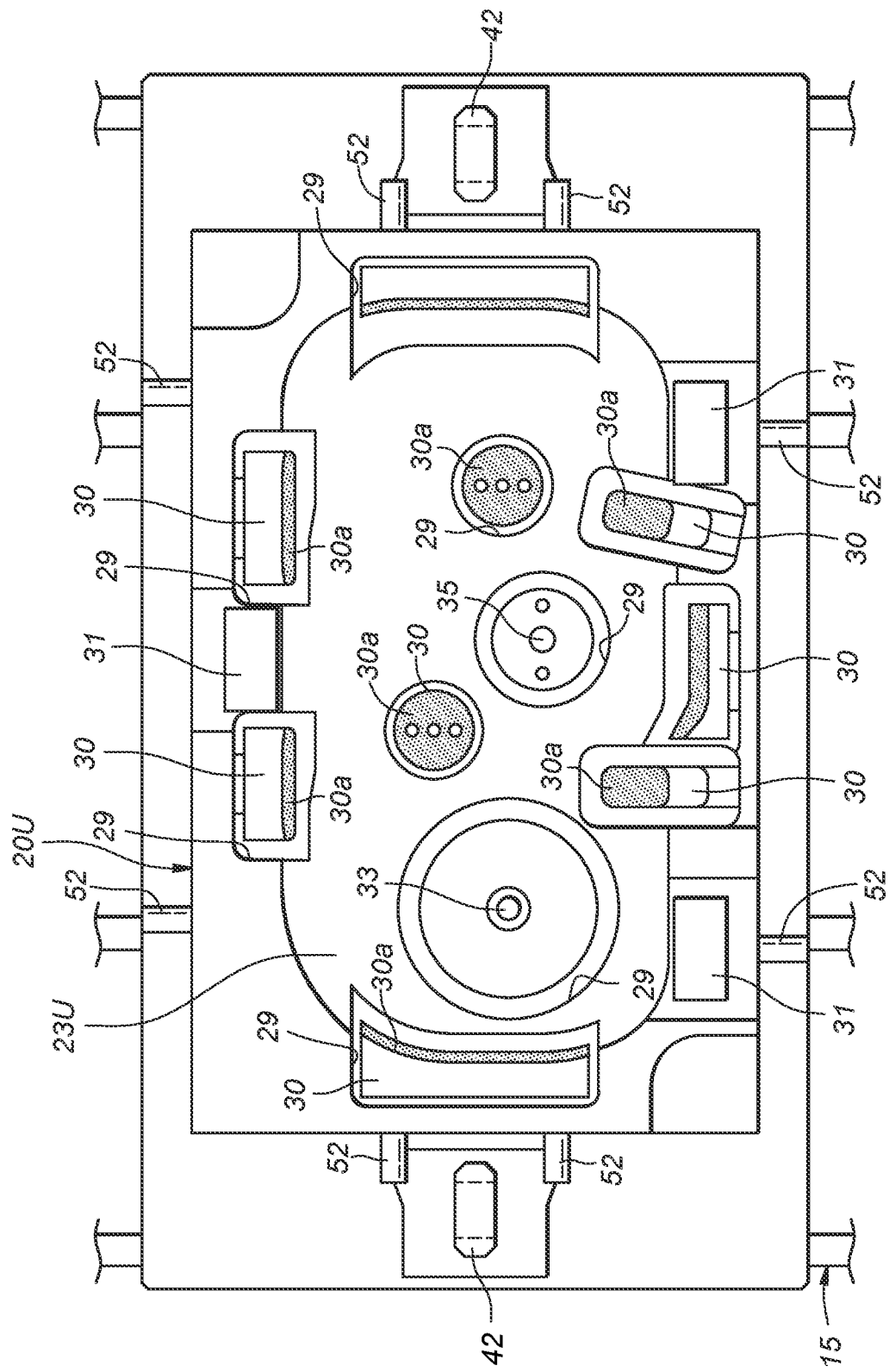
FIG. 5 is a bottom view of the upper receptacle half shown in FIG. 3.

FIG. 5 is a bottom view of the upper receptacle half 20U shown in FIG. 3. As shown in FIGS. 3 and 5, the upper concave surface 23U of the upper receptacle half 20U is provided with multiple (four in the illustrated example) contact members 30 on a ceiling portion thereof and multiple (five in the illustrated example) contact members 30 on a side peripheral portion thereof. The contact members 30 have various shapes such as circular, substantially rectangular, etc.

Further, the ceiling portion of the upper concave surface 23U is provided with a gas supply pipe 33 that protrudes into the inside of the fuel tank 1 to supply the cooling air to the inside of the fuel tank 1. The gas supply pipe 33 is inserted into the inside of the fuel tank 1 from a blow pin hole formed in the fuel tank 1. A compressor 34 (see FIG. 1) is connected to the gas supply pipe 33, and the cooling air is sent from the compressor 34 to the gas supply pipe 33. The ceiling portion of the upper concave surface 23U is further provided with an exhaust pipe 35 for discharge the air in the inside of the fuel tank 1. the exhaust pipe 35 has a bellows-like shape and comes into close contact with an outer peripheral portion of the blow pin hole formed in the fuel tank 1. A pressure regulating valve 36 (see FIG. 1) for maintaining the internal pressure of the fuel tank 1 at a predetermined value is connected to the exhaust pipe 35. When the internal pressure becomes high, the pressure regulating valve 36 is opened so that the air in the fuel tank 1 is discharged to the outside via the exhaust pipe 35. These component parts including the compressor 34, the gas supply pipe 33, the exhaust pipe 35, and the pressure regulating valve 36 configure a pressure applying device 37 for applying an internal pressure to the fuel tank 1.

As shown in FIG. 1, in the state in which the receiving member 20 receives the fuel tank 1, when an internal pressure is applied to the fuel tank 1 by the pressure applying device 37 and the cooling liquid is supplied by the cooling liquid pump 27, the lower receptacle half 20L and the upper receptacle half 20U receive a force in a separating direction. Therefore, to prevent the lower receptacle half 20L and the upper receptacle half 20U from being separated from each other, the cooling apparatus 10 is provided with a lock device 40 that fixes the upper frame 15 to the lower frame 14.

As also shown in FIGS. 2 to 5, the lock device 40 includes a pair of lower lock walls 41 provided in the vicinity of each of two longitudinal ends of the lower frame 14 between which the lower receptacle half 20L is placed. Further, the lock device 40 includes an upper lock wall 42 provided in the vicinity of each of two longitudinal ends of the upper frame 15 such that the upper lock wall 42 is positioned between the lower lock walls 41 of the corresponding pair. The lower lock walls 41 and the upper lock wall 42 on each end are formed with through holes arranged in a line in the opposing direction, and an actuator 44 for inserting and drawing a lock pin 43 into and out of the through holes is provided on an extension line connecting these three through holes. When each actuator 44 pushes the corresponding lock pin 43 into the associated through holes, the upper frame 15 is fixed to the lower frame 14, and the lower receptacle half 20L and the upper receptacle half 20U are prevented from being separated from each other.

Figure 6:
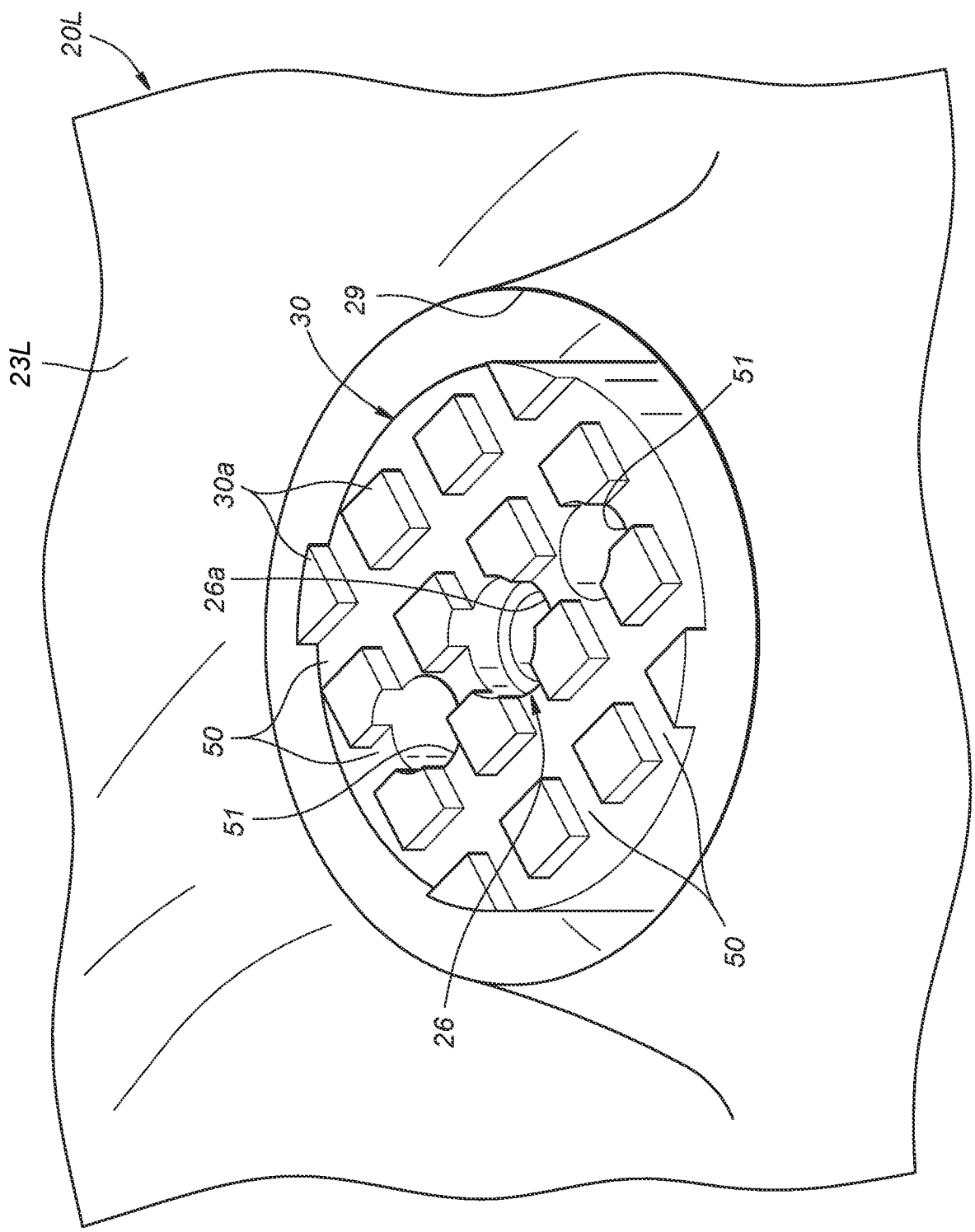
FIG. 6 is an enlarged perspective view of a main part of the lower receptacle half.

FIG. 6 is an enlarged perspective view of a main part of the lower receptacle half 20L. As shown in FIG. 6, the contact surface 30a of the contact member 30 is formed with grooves 50 in a grid pattern. The grooves 50 extending in the longitudinal and lateral directions are linear and intersect each other orthogonally, where the both ends of each groove reach the outer edge of the contact surface 30a. The grooves 50 in the longitudinal and lateral directions have the same width as each other and extend with a constant width. Thereby, the contact surface 30a is divided into multiple rectangular divided parts arranged in the longitudinal and lateral directions.

The contact surface 30a of each contact member 30 is formed with a cooling liquid supply port 26a which constitutes a downstream end of the cooling liquid supply passage 26 (see FIG. 1) and two support holes 51 for supporting the contact member on the lower receptacle half 20L. In other words, the cooling liquid supply passage 26 branches to reach the multiple contact members 30, and the cooling liquid supply port 26a opens in each of the contact surfaces 30a of them. Each cooling liquid supply port 26a is disposed at approximately the center of the corresponding contact surface 30a. The two support holes 51 are arranged in positions interposing the cooling liquid supply port 26a therebetween, and bolts are inserted therein. With the two bolts fastened, the contact member 30 is supported on the lower receptacle half 20L.

The position of each contact member 30 relative to the lower receptacle half 20L can be changed by inserting a shim between the contact member 30 and the lower receptacle half 20L. Therefore, by adjusting the thickness of the shim, the position of the contact member 30 relative to the lower receptacle half 20L in an advancing and retreating direction can be adjusted. Also, by using a tapered shim having a gradually decreasing thickness, the angle of the contact member 30 relative to the lower receptacle half 20L can be changed. Therefore, by adjusting the taper angle and the taper direction (the direction in which the thickness gradually decreases) of the shim, the angle of the contact member 30 relative to the lower receptacle half 20L can be adjusted. Thus, the contact member 30 is supported on the lower receptacle half 20L to be position-adjustable in the advancing and retreating direction and to be angle-adjustable. The contact members 30 are similarly supported on the upper receptacle half 20U.

The cooling liquid supply port 26a is formed such that the center thereof is positioned in a part of the contact surface 30a at a bottom of a groove 50, more specifically, at an intersection between a groove 50 in the longitudinal direction and a groove 50 in the lateral direction. The diameter of the cooling liquid supply port 26a is greater than the width of the grooves 50. Therefore, one of the corners of each of the four divided parts of the contact surface 30a close to the cooling liquid supply port 26a is cut when the cooling liquid supply passage 26 is formed.

The cooling liquid supply port 26a is formed in each of the contact surfaces 30a of the multiple contact members 30. Therefore, the cooling liquid supply passage 26 splits into a number of branches corresponding to at least the number of the contact members 30. As shown in FIGS. 2 to 5, multiple pipe joints 52 defining passages to the cooling liquid supply ports 26a of the contact members 30 protrude on the side surfaces of the lower receptacle half 20L and the upper receptacle half 20U. Hoses defining the branched downstream parts of the cooling liquid supply passage 26 are connected to these pipe joints 52.

In the state of FIG. 1 in which the receiving member 20 receives the fuel tank 1, the multiple contact members 30 each contact the outer surface of the fuel tank 1. Also, the tank mounting pieces 2 of the fuel tank 1 are clamped by the upper and lower clamping parts 31. Further, the gas supply pipe 33 (FIG. 3, FIG. 5) protrudes into the inside of the fuel tank 1, and the exhaust pipe 35 (FIG. 3, FIG. 5) closely contacts the outer surface of the fuel tank 1. In this state, the cooling liquid pump 27 supplies the cooling liquid to the cooling liquid supply passage 26, and the compressor 34 of the pressure applying device 37 supplies the cooling air to the gas supply pipe 33. Thereby, the fuel tank 1 is cooled in a short time while the predetermined shape is maintained.

The cooling liquid is supplied from the cooling liquid supply port 26a shown in FIG. 6 toward the outer surface of the fuel tank 1, passes through the grooves 50 to reliably cool the part of the fuel tank 1 opposing the contact member 30, and flows to the outside of the contact member 30. As shown in FIGS. 1 to 3, the concave surfaces 23 (23L, 23U) formed in the receiving member 20 oppose the outer surface of the fuel tank 1 via a predetermined gap. Therefore, the cooling liquid flowing out of the contact member 30 flows through the gap between the associated concave surface 23 of the receiving member 20 and the outer surface of the fuel tank 1 and is discharged to the outside from the cooling liquid discharge outlet 28 provided in the receiving member 20. Since the fuel tank 1 is received by the lower receptacle half 20L and the upper receptacle half 20U of the receiving member 20, the fuel tank 1 is cooled as a whole by the cooling liquid flowing through the gap between the fuel tank 1 and the receiving member 20. Thus, the whole fuel tank 1 is cooled in a short time while the deformation and dimensional errors are suppressed.

The cooling apparatus 10 is configured as described above. In the following, effects of the cooling apparatus 10 of the present embodiment will be described. As shown in FIG. 6, since the multiple cooling liquid supply ports 26a of the cooling liquid supply passage 26 open in the contact surfaces 30a of the multiple contact members 30, the desired parts of the fuel tank 1 are reliably cooled by providing the contact members 30 at the parts to be cooled. Also, the contact surface 30a of each contact member 30 is provided with the grooves 50 extending from the cooling liquid supply port 26a to the outer edge of the contact surface 30a, the fuel tank 1 is cooled in a state in which contact with the contact members 30 is maintained. Thus, deformation of the contact parts of the fuel tank 1 is suppressed and dimensional errors of the contact parts are reduced.

In the present embodiment, since the grooves 50 are formed on the contact surface 30a in a grid pattern, the part of the fuel tank 1 contacted by each contact member 30 is cooled evenly. Also, compared to a case where the grooves 50 are formed to extend radially from the cooling liquid supply port 26a, the cooling liquid is more likely to create a turbulence, whereby the cooling efficiency is high. In addition, machining of the grooves 50 on the contact member 30 is easy.

As shown in FIGS. 2 to 5, the concave surfaces 23 of the receiving member are provided with the multiple recesses 29, and the contact members 30 are supported by the receiving member 20 in a state partially received in the recesses 29. Thus, in order to arrange the contact members 30, it is unnecessary to provide the receiving member 20 with through holes larger than the contact members 30. Therefore, the cooling liquid does not leak through the through holes in a large amounts, and the whole fuel tank 1 is cooled efficiently.

In the present embodiment, the contact members 30 are supported by the receiving member 20 to be position-adjustable in the advancing and retreating direction, and therefore, even when there is a manufacturing error in the receiving member 20, each contact member 30 can be arranged in the desired position. Thereby, the fuel tank 1 after the cooling is given the desired dimensions.

The contact members 30 are supported by the receiving member 20 to be also angle-adjustable, and therefore, even when there is a manufacturing error in the receiving member 20, each contact member 30 can be arranged in the desired direction. Thereby, the fuel tank 1 after the cooling is given the desired shape.

As shown in FIGS. 1 to 3, the lower receptacle half 20L and the upper receptacle half 20U are provided with the clamping parts 31 for clamping the tank mounting pieces 2. Therefore, the relative position of the parts of the fuel tank 1 contacted by the contact members 30 and the tank mounting pieces 2 clamped by the clamping parts 31 can be set to the desired relationship. Thereby, the fuel tank 1 can be cooled in a state in which the desired shape with respect to the tank mounting pieces 2 is maintained.

As shown in FIGS. 3 and 5, the cooling apparatus 10 further includes the pressure applying device 37 for applying an internal pressure to the fuel tank 1, and the pressure applying device 37 includes the gas supply pipe 33 which is provided in the receiving member 20 and protrudes into the inside of the fuel tank 1 to supply gas to the inside of the fuel tank 1. Thus, since the gas supplied from the gas supply pipe 33 to the inside of the fuel tank 1 applies an internal pressure to the fuel tank 1, the contact between the fuel tank 1 and each contact member 30 can be maintained reliably.

As shown in FIG. 1, the cooling apparatus 10 further includes the lock device that fixes the lower frame 14 and the upper frame 15 to each other. Accordingly, the lower receptacle half 20L and the upper receptacle half 20U are prevented from being separated from each other due to the application of the internal pressure by the pressure applying device 37 and the supply of the cooling liquid by the cooling liquid pump 27 in the state in which the receiving member 20 receives the fuel tank 1. Thus, change of the shape and dimension of the fuel tank 1 due to cooling is prevented.

A concrete embodiment of the present invention has been described in the foregoing, but the present invention is not limited to the above embodiment and may be modified or altered in various ways. For example, in the above embodiment, description was made of a case in which the present invention was applied to the cooling apparatus for the fuel tank 1 as one example, but the present invention may be widely applied for cooling of a tank for containing fluid other than fuel. Besides, the concrete structure, arrangement, number, material, etc. of each member or part may be appropriately changed without departing from the spirit of the present invention. Also, not all of the components shown in the above embodiment are necessarily indispensable and they may be selectively adopted as appropriate.

LIST OF REFERENCE NUMERALS

1: fuel tank
2: tank mounting piece
10: cooling apparatus
14: lower frame (movable frame)
15: upper frame (movable frame)
16: lift device
20: receiving member
20L: lower receptacle half
20U: upper receptacle half
23: concave surface
23L: lower concave surface
23U: upper concave surface
26: cooling liquid supply passage
26a: cooling liquid supply port
27: cooling liquid pump (cooling liquid supply device)
28: cooling liquid discharge outlet
29: recess
30: contact member
30a: contact surface
31: clamping part
33: gas supply pipe
37: pressure applying device
40: lock device
50: groove

The invention claimed is:

1. A cooling apparatus for cooling a hollow tank made of a thermoplastic synthetic resin, the cooling apparatus comprising:
    a pair of movable frames provided to be movable relative to each other so as to clamp the tank;
    multiple contact members provided on each of the pair of movable frames and each having a contact surface configured to contact an outer surface of the tank;
    a cooling liquid supply passage provided with multiple cooling liquid supply ports that respectively open in the contact surfaces of the contact members to supply a cooling liquid toward the outer surface of the tank; and
    a cooling liquid supply device that supplies the cooling liquid to the cooling liquid supply passage,
    wherein each of the contact surfaces is provided with grooves extending from a corresponding one of the cooling liquid supply ports to an outer edge of the contact surface.

2. The tank cooling apparatus according to claim 1, wherein the grooves are provided on the contact surface in a grid pattern.

3. The tank cooling apparatus according to claim 1, further comprising a receiving member including a pair of receptacle halves for receiving a part of the tank,
    wherein the pair of receptacle halves are supported by the pair of movable frames and have respective concave surfaces that oppose the outer surface of the tank via a predetermined gap, and
    the contact members are disposed to protrude from the concave surfaces of the receiving member, and a cooling liquid discharge outlet is provided in the receiving member.

4. The tank cooling apparatus according to claim 3, wherein the concave surfaces of the receiving member are provided with multiple recesses, and the contact members are supported by the receiving member in a state partially received in the recesses.

5. The tank cooling apparatus according to claim 4, wherein the contact members are supported by the receiving member to be position-adjustable in an advancing and retreating direction.

6. The tank cooling apparatus according to claim 5, wherein the contact members are supported by the receiving member to be also angle-adjustable.

7. The tank cooling apparatus according to claim 3, wherein the pair of receptacle halves is provided with clamping parts for clamping a tank mounting piece which is protrudingly formed on the outer surface of the tank.

8. The tank cooling apparatus according to claim 3, further comprising a pressure applying device for applying an internal pressure to the tank, wherein the pressure applying device includes a gas supply pipe which is provided in the receiving member and protrudes into an inside of the tank to supply gas to the inside of the tank.

9. The tank cooling apparatus according to claim 8, further comprising a lock device that fixes the pair of movable frames to prevent the pair of receptacle halves from being separated from each other due to application of the internal pressure by the pressure applying device and supply of the cooling liquid by the cooling liquid supply device in a state in which the receiving member receives the tank.

* * * * *